(12) United States Patent  (10) Patent No.: US 8,246,253 B2
Masui et al.  (45) Date of Patent: Aug. 21, 2012

(54) ROLLING BEARING

(75) Inventors: Takashi Masui, Fujiidera (JP); Junichi Kubo, Kashiwara (JP); Masahide Sunagawa, Tokushima (JP)

(73) Assignee: JTekt Corporation, Osaka-Shi, Osaka (JP)

( * ) Notice: Subject to any disclaimer, the term of this patent is extended or adjusted under 35 U.S.C. 154(b) by 268 days.

(21) Appl. No.: 12/656,403

(22) Filed: Jan. 28, 2010

(65) Prior Publication Data

US 2010/0189387 A1 Jul. 29, 2010

(30) Foreign Application Priority Data

Jan. 29, 2009 (JP) .................................. 2009-018418

(51) Int. Cl.
*F16C 19/18* (2006.01)
*F16C 43/04* (2006.01)
*F16C 33/76* (2006.01)
(52) U.S. Cl. ....................................... 384/484; 384/477
(58) Field of Classification Search .................. 384/477, 384/484–486, 544; 277/345, 348, 549, 551, 277/563
See application file for complete search history.

(56) References Cited

U.S. PATENT DOCUMENTS

| 4,928,979 A | * | 5/1990 | Nagasawa | 277/348 |
| 6,637,754 B1 | * | 10/2003 | Ohtsuki et al. | 384/448 |
| 7,464,939 B2 | * | 12/2008 | Matsui | 384/448 |
| 7,770,896 B2 | * | 8/2010 | Foti | 277/551 |
| 7,931,278 B2 | * | 4/2011 | Krulis et al. | 277/563 |
| 2008/0124017 A1 | * | 5/2008 | Umekida | 384/544 |

FOREIGN PATENT DOCUMENTS

| JP | 11336775 A | * | 12/1999 |
| JP | 2002048247 A | * | 2/2002 |
| JP | 2002-228007 | | 8/2002 |
| JP | 2003287142 A | * | 10/2003 |
| JP | 2006-118625 | | 5/2006 |
| JP | 2008008448 A | * | 1/2008 |

* cited by examiner

*Primary Examiner* — Marcus Charles
(74) *Attorney, Agent, or Firm* — McGinn IP Law Group, PLLC

(57) ABSTRACT

A rolling bearing has a metallic member sealing member at one axial end thereof. The sealing member has a first cylinder section including a first cylinder section facing surface which is in contact with an outer peripheral surface of an inner ring, a second cylinder section connected to the first cylinder section and including a second cylinder section facing surface which faces the outer peripheral surface of the inner ring, and a flange section connected to the second cylinder section via a bend section. In a state before the sealing member is press fitted in the bearing, a radial position of the second cylinder section facing surface is closer to the flange section than a radial position of the first cylinder section facing surface. The rolling bearing has another metallic member sealing member at another axial end thereof.

9 Claims, 4 Drawing Sheets

ROLLING BEARING

TECHNICAL FIELD

The present invention relates to a rolling bearing having a sealing member.

BACKGROUND ART

A sealing device for a rolling bearing according to prior art is disclosed in JP 2006-118625 A (Patent Literature 1).

Reference sign 100 in FIG. 4 generally denotes a rolling bearing for supporting a wheel in a rotatable manner, which is composed of an outer ring 101, an inner ring, 102, and, a number of steel balls 103 placed between the rings and arrayed in a circumferential direction of the bearing.

The sealing device for the rolling bearing is intended to prevent muddy water, dust and the like from entering from the outside into the inside of the rolling bearing 100 and to prevent grease for lubricating the steel balls 103 from flowing out of the bearing. The sealing device includes a slinger 113 which is composed of a sleeve 111 fitted around an outer peripheral surface of the inner ring 102 and a seal flange 112 extending radially from one axial end of the sleeve 111 at a generally right angle relative to a shaft center, and an attachment ring 120 fitted around an inner peripheral surface of the outer ring 101. The sealing device also includes an outer peripheral side seal lip 121 and an inner peripheral side seal lip 122, which are integrally provided on the attachment ring 120, abutted against the seal flange 112 of the slinger 113 in a slidable manner and are concentric with each other. Also, the sealing device includes a labyrinth lip 123 provided integrally with the attachment ring 120 and facing an outer peripheral surface of the sleeve 111 of the slinger 113 in a non-contact manner, and a gasket section 124 provided integrally with the attachment ring 120 and in contact with the inner peripheral surface of the outer ring 101.

The slinger 113, which is manufactured by punch pressing of a metal plate such as a sheet steel, is composed of, as described above, the sleeve 111 press fitted around the outer peripheral surface of the inner ring 102 of the rolling bearing 100, and the disc-like seal flange 112 extending radially at an end portion of the bearing toward the outer peripheral side of the bearing, orthogonally to the shaft center. More specifically, the slinger 113 has a generally L-shaped cross section taken along a plane containing the shaft center.

In the slinger 113, with an axially inner part of the sleeve 111 (a part of the sleeve opposite from the seal flange 112) press fitted around the outer peripheral surface of the inner ring 102, the sleeve 111 radially expands in an elasticity range and causes stress in the inner ring 102. Further, with an axially outer part of the sleeve 111 (i.e., a part of the sleeve adjacent to the seal flange 112) press fitted around the outer peripheral surface of the inner ring 102, large stress is caused in the inner ring 102 by the effect of radial rigidity of the seal flange 112. Consequently, the inner ring 102 deforms, and as a result of contraction of the inside diameter of the inner ring, the inside diameter of the inner ring 102 becomes smaller than a specified diameter, thereby causing a problem of the inner ring 102 having an irregular inside diameter.

Moreover, with the axially outer part of the sleeve 111 (i.e., the part of the sleeve 11 adjacent to the seal flange 112) press fitted around the outer peripheral surface of the inner ring 102, the seal flange 112 is deformed to be inclined toward the axial outside of the bearing, thereby causing damage on sealing performance.

SUMMARY OF INVENTION

Technical Problem

Accordingly, an object of the present invention is to provide a rolling bearing which can prevent deformation of a raceway member and a sealing member due to press fitting of the sealing member around a peripheral surface of the raceway member.

Solution to Problem

In order to solve the problem, a rolling bearing according to an aspect of the present invention includes:

a first raceway member having an inner peripheral surface and an outer peripheral surface, wherein one peripheral surface which is either the inner or the outer peripheral surface includes a first raceway surface;

a second raceway member having a second raceway surface facing the first raceway surface in a radial direction of the bearing;

a plurality of rolling elements rotatably provided between the first raceway surface and the second raceway surface; and a sealing member made of a metallic member press fitted on the one peripheral surface, the sealing member comprising:

a first cylinder section including a first cylinder section facing surface which is in contact with the one peripheral surface;

a second cylinder section connected to the first cylinder section and including a second cylinder section facing surface which faces the one peripheral surface;

a flange section extending radially away from the second cylinder section; and a bend section for connecting the second cylinder section to the flange section, wherein in a state before the sealing member is press fitted on the one peripheral surface, a radial position of the second cylinder section facing surface is closer to the flange section than a radial position of the first cylinder section facing surface.

According to the rolling bearing of the invention, in the sealing member in the state prior to press fitting on the peripheral surface, a radial position of the second cylinder section facing surface of the second cylinder section connected to the flange section is closer to the flange section than a radial position of the first cylinder section facing surface that is in contact with the one peripheral surface of the first raceway member. Accordingly, when the first cylinder section of the sealing member has been press fitted on the one peripheral surface of the first raceway member, the second cylinder section facing surface may press the one peripheral surface of the first raceway member with a smaller force than force of the first cylinder section facing surface pressing the one peripheral surface of the first raceway member. Also, the second cylinder section facing surface may not press the one peripheral surface of the first raceway member at the time of press fitting.

According to the invention, therefore, it becomes possible to suppress deformation of the first raceway member as well as deformation of the sealing member itself in the state after the sealing member has been press fitted in the bearing.

In one embodiment, the first cylinder section facing surface and the second cylinder section facing surface are connected via a spacer section.

According to the embodiment, the spacer section makes it possible to reliably bring the second cylinder section facing surface of the sealing member closer to the flange section from the first cylinder section facing surface.

In one embodiment, in a state after the sealing member has been press fitted on the one peripheral surface, the second cylinder section facing surface is in non-contact with the one peripheral surface.

According to the embodiment, in the state after the sealing member has been press fitted, the second cylinder section facing surface of the sealing member does not come into contact with the one peripheral surface of the first raceway member, so that it becomes possible to prevent deformation of the first raceway member and the sealing member reliably.

The second cylinder section facing surface may directly connect to the first cylinder section facing surface, and in a state before the sealing member is press fitted on the one peripheral surface, the second cylinder section facing surface inclines radially outward so as to be closer to the flange section as it goes axially away from the first cylinder section facing surface, namely, with increasing axial distance from the first cylinder section facing surface.

Advantages Effects of Invention

According to the rolling bearing of the invention, force of the second cylinder section facing surface that presses the one peripheral surface of the first raceway member when the first cylinder section of the sealing member is press fitted on the one peripheral surface of the first raceway member becomes smaller than force of the first cylinder section facing surface that presses the one peripheral surface of the first raceway member. As a result, it becomes possible to suppress deformation of the first raceway member as well as deformation of the sealing member itself in the state posterior to press fitting of the sealing member.

BRIEF DESCRIPTION OF DRAWINGS

The present invention will become more fully understood from the detailed description given hereinbelow and the accompanying drawings which are given by way of illustration only, and thus are not intended to limit the present invention, and wherein.

DESCRIPTION OF EMBODIMENTS

Hereinbelow, the present invention will be described in detail in conjunction with embodiments with reference to the accompanying drawings.

Figure 1:
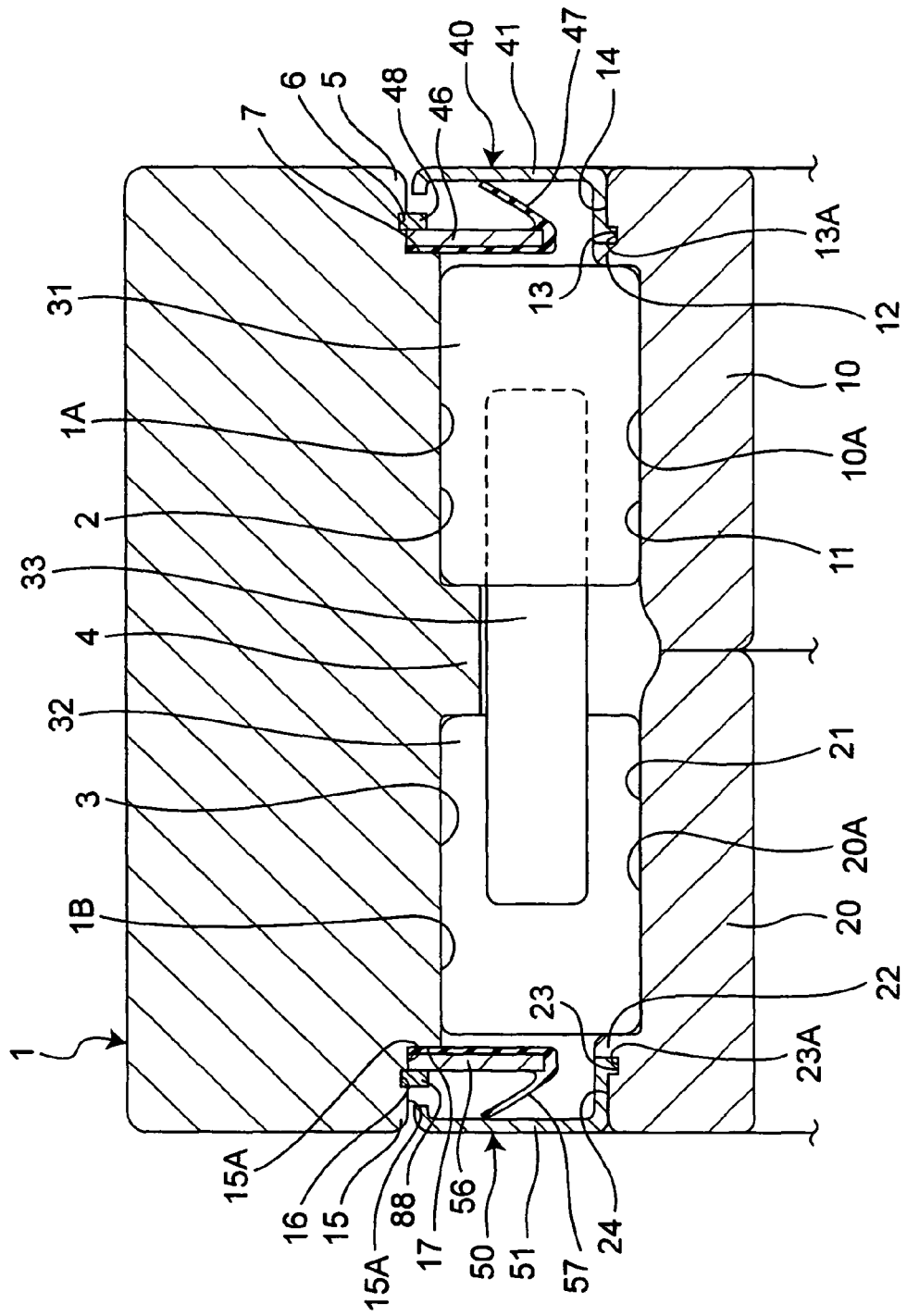
FIG. 1 is a cross sectional view of an embodiment of the rolling bearing according to the present invention.
Figure 2:
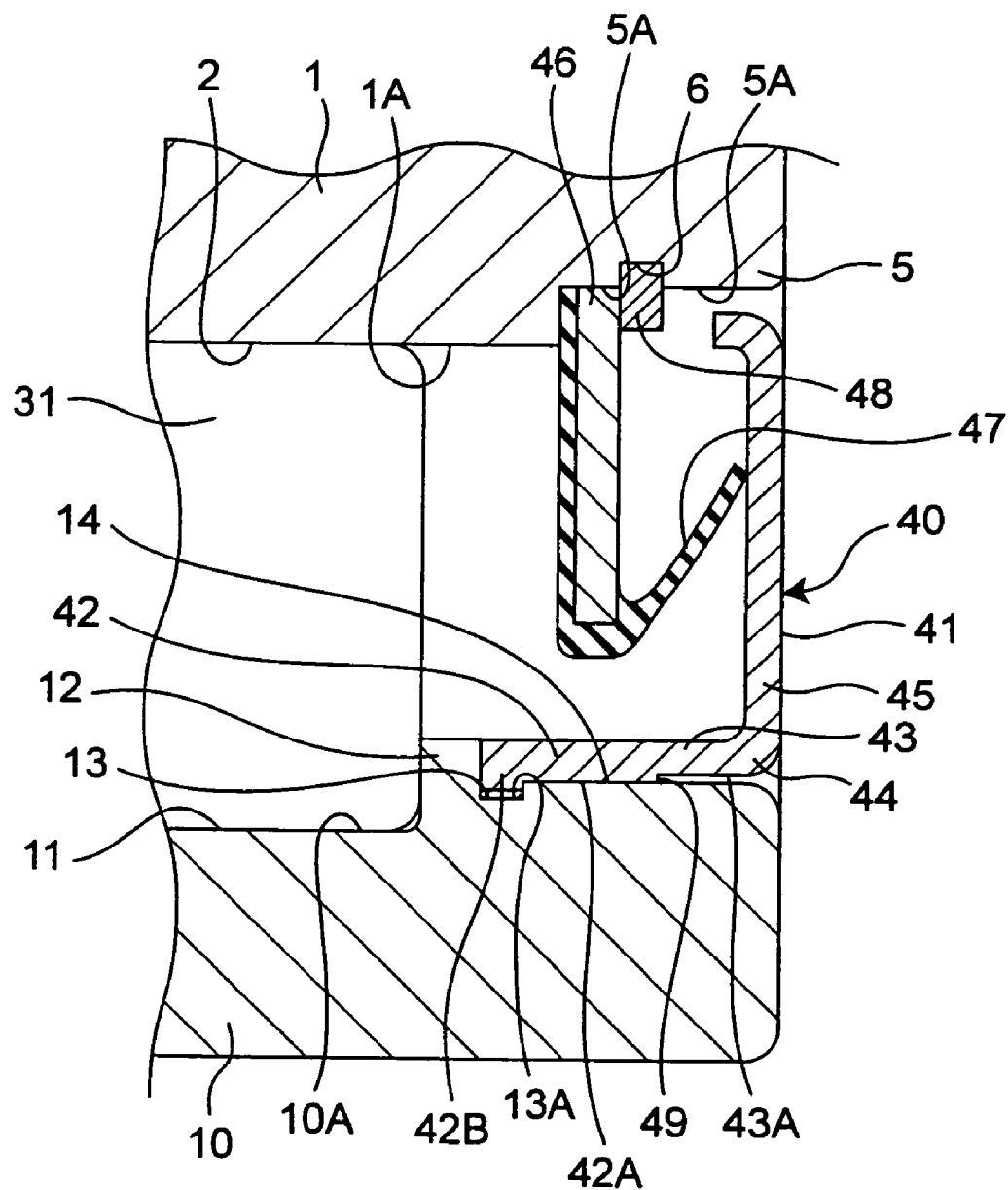
FIG. 2 is an enlarged sectional view showing a sealing section 40 of the embodiment.
Figure 3A:
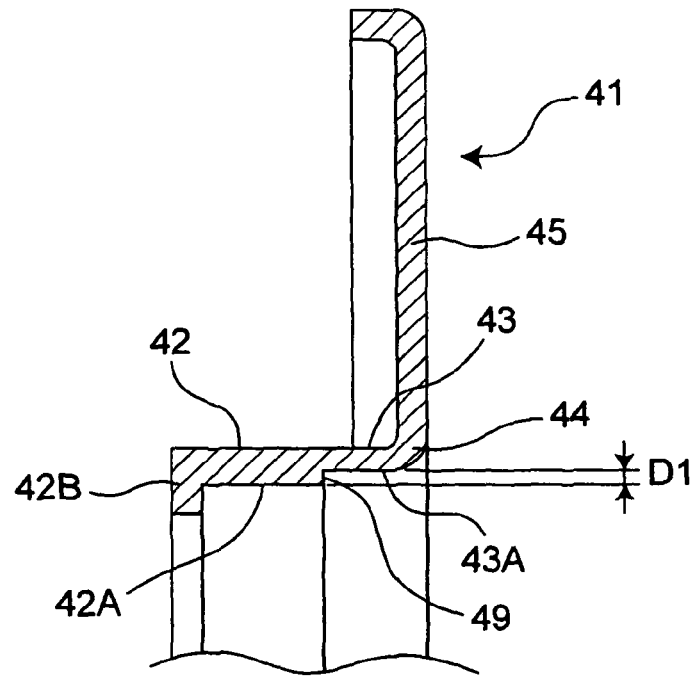
FIG. 3A is a cross sectional view of a slinger 41 in the embodiment.
Figure 3B:
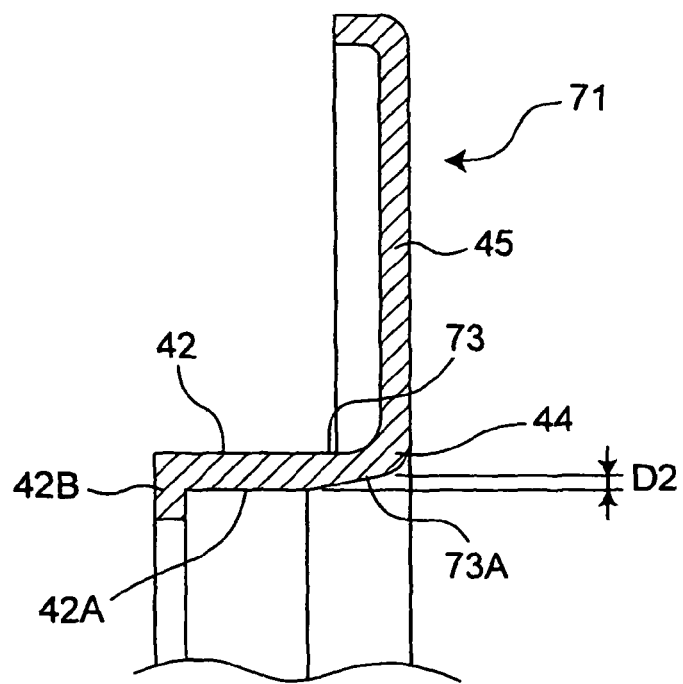
FIG. 3B is a cross sectional view of a modified example of the slinger in the embodiment.

FIG. 1 is a cross sectional view of a rolling bearing in an embodiment of the invention. FIG. 2 is an enlarged sectional view showing an essential part of the rolling bearing of this embodiment. FIG. 3A is a cross sectional view of a slinger 41 as a sealing member included in the rolling bearing of the embodiment, while FIG. 3B is a cross sectional view of a slinger 71 as a modified example.

The rolling bearing of the present embodiment includes an outer ring 1 having two rows of raceway surfaces 2, 3 on inner peripheral surfaces 1A, 1B thereof, an inner ring 10 having a raceway surface 11 on an outer peripheral surface 10A thereof, the raceway surface 11 facing the raceway surface 2 of the outer ring 1, and an inner ring 20 having a raceway surface 21 on an outer peripheral surface 20A thereof, the raceway surface 21 facing the raceway surface 3 of the outer ring 1. The inner rings 10, 20 constitute a first raceway member, while the outer ring 1 constitutes a second raceway member. Moreover, the outer peripheral surface 10A, 20A of the inner ring 10, 20 constitute the one peripheral surface. The present embodiment also includes a plurality of cylindrical rollers 31 which are rolling elements rotatably provided between the raceway surface 2 of the outer ring 1 and the raceway surface 11 of the inner ring 10, and a plurality of cylindrical rollers 32 which are rolling elements rotatably provided between the raceway surface 3 of the outer ring 1 and the raceway surface 21 of the inner ring 20. It is to be noted that the inner ring 10, 20 constituting the first raceway member is annular and hollow, and the outer ring 1 constituting the second raceway member is also annular and hollow.

The embodiment includes a sealing section 40 placed between the inner peripheral surface 1A of the outer ring 1 and the outer peripheral surface 10A of the inner ring 10, and a sealing section 50 placed between the inner peripheral surface 1B of the outer ring 1 and the outer peripheral surface 20A of the inner ring 20. The present embodiment also includes a retainer 33 for retaining the cylindrical rollers 31 and the cylindrical rollers 32 at a constant interval.

The outer ring 1 has a protruding section 4 provided in the center of the inner peripheral surfaces 1A and 1B. The protruding section 4 regulates the cylindrical rollers 31 and 32 to prevent them from shifting toward an axial center of the rolling bearing. Annular step sections 5, 15, which are formed on axially outer sides of the inner peripheral surfaces 1A, 1B of the outer ring 1, have inner diameter surfaces 5A, 15A in the form of cylindrical surfaces. The annular step sections 5, 15 have annular retaining ring grooves 6, 16.

It is to be noted that the expression "axially outer side" and similar expressions used herein refer to a direction toward either axial end of a bearing as seen from the axial center of the bearing, whereas the expression "axially inner side" and similar expressions refer to a direction toward the axial center of the bearing as seen from either axial end of the bearing.

The inner ring 10 and the inner ring 20 are in contact with each other on their axially inner end surfaces. As shown in FIG. 2, the inner ring 10 has, on the axially outside of the raceway surface 11 of the outer peripheral surface 10A, a large diameter section 12 larger in diameter than the raceway surface 11, a circumferential groove 13 adjacent to the large diameter section 12, and a peripheral surface 14 smaller in diameter than the large diameter section 12 and larger in diameter than the circumferential groove 13. It is to be noted that the diameter of the peripheral surface 14 of the inner ring 10 may be the same as the large diameter section 12. Also, the circumferential groove 13 may be omitted.

As shown in FIG. 1, on the axially outer side of the raceway surface 21 of the outer peripheral surface 20A, the inner ring 20 is formed with a large diameter section larger in diameter than the raceway surface 21, a circumferential groove 23 adjacent to the large diameter section 22, and a peripheral surface 24 smaller in diameter than the large diameter section 22 and larger in diameter than the circumferential groove 23. It is to be noted that the diameter of the peripheral surface 24 of the inner ring 20 may be the same as the large diameter section 22, and the circumferential groove 13 may be omitted.

The sealing section 40 is intended to prevent water, dust and the like from entering from the outside into the inside of the rolling bearing and to prevent grease for lubricating the cylindrical rollers 31, 32 from flowing out of the bearing. The sealing section 40 includes a slinger 41 as a sealing member press fitted around the peripheral surface 14 of the outer peripheral surface 10A of the inner ring 10, an annular metal core 46 having an outer diameter smaller than the diameter of the inner diameter surface 5A of the annular step section 5 of the outer ring 1 and extending in a radial direction, and a seal lip 47 formed as a part of an elastic member (preferably formed of rubber material) fitted on the annular metal core 46 with its tip being in sliding contact with the slinger 41. The slinger 41 consists of a metallic member. The annular metal core 46 and the elastic member fitted on the annular metal core 46 of the sealing section 40 are fitted to a portion of the inner diameter surface 5A of the annular step section 5 in the outer ring 1, and held in the axial direction between a step surface 7 of the outer ring 1 and a retaining ring (e.g., a C-shaped ring) 48 received in the annular retaining ring groove 6, which is formed axially in the middle of the inner diameter surface 5A of the annular step section 5 in the outer ring 1. Thus, the seal lip 47 and the annular metal core 46 are positioned in place with respect to both the axial direction and the radial direction of the bearing.

As shown in FIG. 2 and FIG. 3A, the slinger 41 has a first cylinder section 42, a second cylinder section 43 continuous in the axial direction and connected to the first cylinder section 42, a flange section 45 extending in the radial direction away from the second cylinder section 43, and a bend section 44 for connecting the second cylinder section 43 to the flange section 45. The first *cylinder section 42 has a first cylinder section facing peripheral surface 42A which is in contact with the peripheral surface 14 in the outer peripheral surface 10A of the inner ring 10. The second cylinder section 43 has a second cylinder section facing peripheral surface 43A. The second cylinder section facing peripheral surface 43A and the first cylinder section facing peripheral surface 42A are connected via a spacer section 49. The second cylinder section facing peripheral surface 43A is a surface whose radial position is closer to the flange section 45 than the first cylinder section facing peripheral surface 42A.

In this embodiment, the spacer section 49 of the slinger 41 is formed to have a dimension, or height, D1, which is close to an interference of the slinger 41 press fitted on the inner ring 10. The dimension close to the interference should preferably be equal to or larger than the interference, but it may be smaller than the interference. The first cylinder section 42 of the slinger has, at an axially inner end thereof, an annular protruding section 42B that protrudes radially inwardly. The annular protruding section 42B is received in and engages with the circumferential groove 13 of the inner ring 10. The inner diameter surface of the annular protruding section 42B faces a bottom (outer peripheral surface) 13A of the circumferential groove 13 in a non-contact manner. It is to be noted that the annular protruding section 42B may be omitted.

Although the spacer section 49 of the slinger 41 shown in FIG. 3A is formed vertically in the radial direction from the first cylinder section facing peripheral surface 42A of the first cylinder section 42 to the second cylinder section facing peripheral surface 43A of the second cylinder section 43, the slinger 41 shown in FIG. 3A may be replaced with a slinger 71 shown in FIG. 3B. The slinger 71 is made of a metallic member and is different from the slinger 41 only in the point that a second cylinder section 73 is provided in place of the second cylinder section 43. In the slinger 71, the second cylinder section 73 has a second cylinder section facing peripheral surface 73A. The second cylinder section facing peripheral surface 73A at an axially inner end thereof is radially at the same level as the first cylinder section facing peripheral surface 42A of the first cylinder section 42. And, the second cylinder section facing peripheral surface 73A forms an inclined surface from the axially inner end toward an axially outer end thereof with its radial position getting closer to the flange section 45. In the slinger 71 shown in FIG. 3B, a radial dimension difference D2 between the axially outer and inner ends of the second cylinder section facing surface 73A should be set to a value closer to the interference, for example.

The sealing section 50 has the same structure as the sealing section 40, and is placed symmetrically to the sealing section 40 relative to an orthogonal plane which intersects a central axis at right angles axially in the middle of the rolling bearing. More specifically, the sealing section 50 includes a slinger 51 as a sealing member press fitted around the peripheral surface 24 in the outer peripheral surface 20A of the inner ring 20, an annular metal core 56 having an outer diameter smaller than the diameter of the inner diameter surface 15A of the annular step section 15 of the outer ring 1 and extending in the radial direction, and a seal lip 57 formed as a part of an elastic member (preferably formed of rubber material) fitted on the annular metal core 56 with its tip being in sliding contact with the slinger 51. The slinger 51 is made of a metallic member. The annular metal core 56 and the elastic member fitted to the annular core 56 of the sealing section 50 are fitted to a portion of the inner diameter surface 15A of the annular step section 15 of the outer ring 1, and held in the axial direction between a step surface 17 of the outer ring 1 and a retaining ring (e.g., a C-shaped ring) 88 received in the annular retaining ring groove 16, which is formed axially in the middle of the inner diameter surface 15A of the annular step section 15 in the outer ring 1. Thus, the seal lip 57 and the annular metal core 56 are positioned in place with respect to the axial direction and the radial direction of the bearing.

Figure 3C:
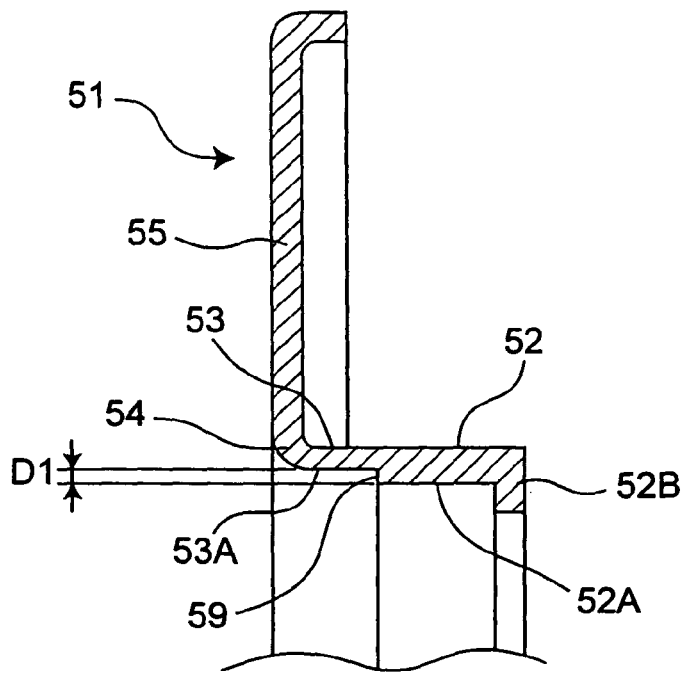
FIG. 3C is a cross sectional view of a slinger 51 in the embodiment.
Figure 4:
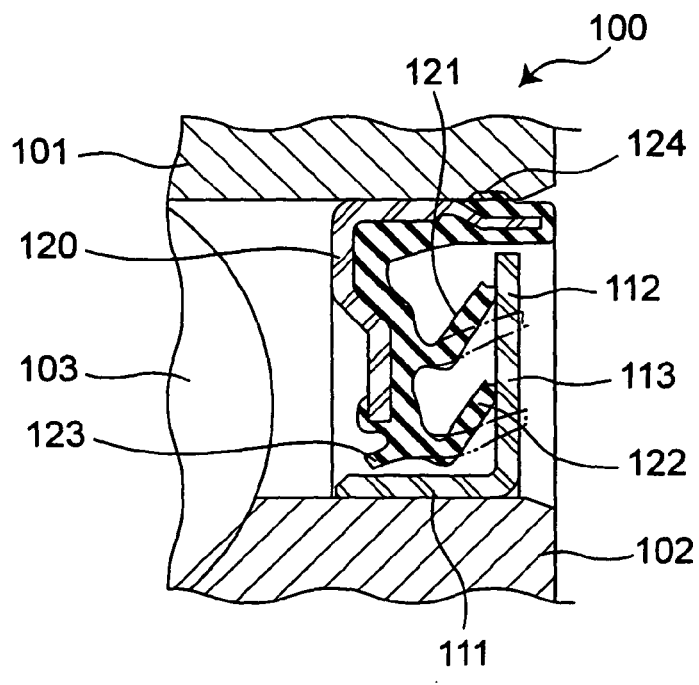
FIG. 4 is a cross sectional view of a prior art sealing device for a rolling bearing.

The slinger 51, which has the same structure as the slinger 41, has a first cylinder section 52, a second cylinder section 53 continuous in the axial direction and connected to the first cylinder section 52, a flange section 55 extending in the radial direction away from the second cylinder section 53, and a bend section 54 for connecting the second cylinder section 53 to the flange section 55 as shown in FIG. 3C. The first cylinder section 52 has a first cylinder section facing peripheral surface 52A which is in contact with the peripheral surface 24 in the outer peripheral surface 20A of the inner ring 20. The second cylinder section 53 includes a second cylinder section facing surface 53A. The second cylinder section facing surface 53A and the first cylinder section facing peripheral surface 52A are connected via a spacer section 59. The second cylinder section facing surface 53A is a surface whose radial position is closer to the flange section 55 than the first cylinder section facing surface 52A. The first cylinder section 52 of the slinger 51 has, at an axially inner end thereof, an annular protruding section 52B that protrudes radially inwardly. The annular protruding section 52B is received in and engages with the circumferential groove 23 of the inner ring 20. The inner diameter surface of the annular protruding section 52B faces a bottom (outer peripheral surface) 23A of the circumferential groove 23 in a non-contact manner.

As shown in FIG. 2, in the state after the slinger 41 has been press fitted around the peripheral surface 14 of the outer peripheral surface 10A of the inner ring 10, the second cylinder section facing surface 43A of the second cylinder section 43 is in non-contact with the peripheral surface 14. Since the annular protruding section 42B engages with the circumferential groove 13 of the inner ring 10 in this state, the slinger 41 does not slip out in the axial direction, and since the first cylinder section 42 is in pressure contact with the peripheral surface 14 of the inner ring 10, co-rotation of the slinger 41 is prevented.

At the time of press fitting, the first cylinder section 42 expands radially outward by an amount of the interference. In this case, a flange section 45-side portion of the second cylinder sections 43 is restrained by the flange section 45 through the bend section 44 and therefore is unlikely to expand, though at least a portion of the second cylinder sections 43 adjacent to the first cylinder section 42 expands with expansion of the diameter, of the first cylinder section 42. As a consequence, the second cylinder section facing surface 43A of the second cylinder section 43 is in non-contact with the peripheral surface 14.

In short, when the first cylinder section 42 of the slinger 41 is press fitted around the peripheral surface 14 in the outer peripheral surface 10A of the inner ring 10, the inner ring 10 is prevented from being deformed due to an influence of rigidity of the flange section 45 of the slinger 41 having a large diameter. Therefore, it becomes possible to prevent the inner diameter of the inner ring 10 from contracting when the slinger 41 is press fitted around the inner ring 10, and thereby to avoid such failure that the inner diameter of the inner ring 10 becomes irregular. Moreover, the second cylinder section 43 of the slinger 41 absorbs the stress generated by press fitting and prevents generation of stress in the flange section 45, so that inclination of the flange section 45 can be prevented.

The description provided regarding the sealing section 40 also applies to the sealing section 50. Thus, in the state after the slinger 51 has been press fitted on the peripheral surface 24 in the outer peripheral surface 20A of the inner ring 20, the second cylinder section facing peripheral surface 53A of the second cylinder section 53 is in non-contact with the peripheral surface 24. In short, when the slinger 51 is press fitted on the peripheral surface 24 of the first cylinder section 52, the inner ring 20 is prevented from being deformed due to the influence of rigidity of the flange section 55 of the slinger 51 having a large diameter. Therefore, it becomes possible to prevent the inner diameter of the inner ring 20 from contracting when the slinger 51 is press fitted around the inner ring 20, and to thereby avoid such failure that the inner diameter of the inner ring 20 becomes irregular. Moreover, the second cylinder section 53 of the slinger 51 absorbs the stress caused by press fitting and prevents generation of stress in the flange section 55, so that inclination of the flange section 55 can be prevented.

In the above embodiment the dimension D1 of the spacer section 49 of the slinger 41 shown in FIG. 3A is set larger than the interference of the slinger 41 to be press fitted on the inner ring 10, and the second cylinder section facing surface 43A of the second cylinder section 43 is made to be in non-contact with the peripheral surface 14 in the state posterior to its press fitting as shown in FIG. 2. Alternatively, the dimension D1 of the spacer section 49 of the slinger 41 may be set equal to or smaller than the interference, and the second cylinder section facing surface 43A may be in slight contact with the peripheral surface 14 to the extent that the second cylinder section facing surface 43A is prevented from deforming the peripheral surface 14 in the state posterior to the press fitting of the slinger.

Although the embodiment has been described in conjunction with the case where a rolling bearing is a cylindrical roller bearing, it should be appreciated that the present invention is also applicable to ball bearings using balls as rolling elements and to conical bearings using conical rollers as rolling elements. Although the embodiment has also been described in conjunction with the case where the slinger 41 as a sealing member is press fitted on the inner ring, the invention is also applicable to the case where the sealing member is press fitted on an outer ring. Also, although the embodiment has been described in conjunction with the case where the slinger 41 as a sealing member is press fitted on an inner ring, the invention is applicable to the case where a sealing section as a sealing member is press fitted on an inner ring or an outer ring. In that case, deformation of an inner ring or an outer ring on which the sealing section is press fitted as well as deformation of the sealing section can be suppressed by making a portion of the sealing section to be press fitted on the inner ring or the outer ring with a metallic member and forming a first cylinder section, a second cylinder section, a flange section and a bend section of the invention. Although the embodiment has also been described in conjunction with the case where two rows of rolling elements are provided, a single row or three or more rows of rolling elements may be provided. However, since each of these modifications would be able to be easily implemented based on the disclosure of this application by those skilled in the art, illustration thereof by drawings has been omitted.

Embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

REFERENCE SIGNS LIST

1: outer ring
1A, 1B: inner peripheral surfaces
2, 3: raceway surfaces
5, 15: annular step sections
6, 16: annular grooves
10, 20: inner rings
10A, 20A: outer peripheral surfaces
11, 21: raceway surfaces
12, 22: large diameter sections
13, 23: circumferential grooves
14, 24: peripheral surface
31, 32: cylindrical rollers
40, 50: sealing sections
41, 51, 71: slingers
42, 52: first cylinder sections
42A, 52A: first cylinder section facing peripheral surface
43, 53, 73: second cylinder sections
43A, 53A, 73A: second cylinder section facing peripheral surfaces
44, 54: bend sections
45, 55: flange sections
49, 59: spacer section Citation List

PATENT LITERATURE
PTL 1: JP 2006-118625 A (FIG. 1)

The invention claimed is:
1. A rolling bearing, comprising:
a first raceway member having an inner peripheral surface and an outer peripheral surface, wherein one peripheral surface which comprises one of the inner and the outer peripheral surfaces includes a first raceway surface;

a second raceway member having a second raceway surface facing the first raceway surface in a radial direction of the bearing;

a plurality of rolling elements rotatably provided between the first raceway surface and the second raceway surface; and a sealing member comprising a metallic member press fitted on the one peripheral surface, the sealing member comprising:

a first cylinder section including a first cylinder section facing surface which is in contact with the one peripheral surface;

a second cylinder section connected to the first cylinder section and including a second cylinder section facing surface which faces the one peripheral surface;

a flange section extending radially away from the second cylinder section; and a bend section for connecting the second cylinder section to the flange section, wherein, in a state before the sealing member is press fitted on the one peripheral surface, a radial position of the second cylinder section facing surface is closer to the flange section than a radial position of the first cylinder section facing surface, and wherein, in a state after the sealing member has been press fitted on the one peripheral surface, the second cylinder section facing surface is in non-contact with the one peripheral surface.

2. The rolling bearing as claimed in claim 1, wherein the first cylinder section facing surface and the second cylinder section facing surface are connected via a spacer section.

3. The rolling bearing as claimed in claim 1, wherein the second cylinder section facing surface directly connects to the first cylinder section facing surface, and in a state before the sealing member is press fitted on the one peripheral surface, the second cylinder section facing surface inclines radially outward so as to be closer to the flange section as it goes axially away from the first cylinder section facing surface.

4. The rolling bearing as claimed in claim 1, further comprising another sealing member that has a same structure as the sealing member.

5. The rolling bearing as claimed in claim 1, further comprising another sealing member, wherein the sealing member is placed symmetrically with respect to said another sealing member relative to an orthogonal plane which intersects a central axis at right angles axially in a middle of the rolling bearing.

6. The rolling bearing as claimed in claim 1, wherein the first cylinder section comprises, at an axially inner end thereof, an annular protruding section that protrudes radially inwardly.

7. The rolling bearing as claimed in claim 6, further comprising a circumferential groove, said annular protruding section being received and engaging with the circumferential groove.

8. A rolling bearing, comprising:

a first raceway member having an inner peripheral surface and an outer peripheral surface, wherein one peripheral surface which comprises one of the inner and the outer peripheral surfaces includes a first raceway surface;

a second raceway member having a second raceway surface facing the first raceway surface in a radial direction of the bearing;

a plurality of rolling elements rotatably provided between the first raceway surface and the second raceway surface; and a pair of sealing members comprising a metallic member press fitted on the one peripheral surface and being located axially on opposing sides of the rolling elements, each of the pair of sealing members comprising:

a first cylinder section including a first cylinder section facing surface which is in contact with the one peripheral surface;

a second cylinder section connected to the first cylinder section and including a second cylinder section facing surface which faces the one peripheral surface;

a flange section extending radially away from the second cylinder section; and a bend section for connecting the second cylinder section to the flange section, wherein, in a state before the sealing member is press fitted on the one peripheral surface, a radial position of the second cylinder section facing surface is closer to the flange section than a radial position of the first cylinder section facing surface.

9. A rolling bearing, comprising:

a first raceway member having an inner peripheral surface and an outer peripheral surface, wherein one peripheral surface which comprises one of the inner and the outer peripheral surfaces includes a first raceway surface;

a second raceway member having a second raceway surface facing the first raceway surface in a radial direction of the bearing;

a plurality of rolling elements rotatably provided between the first raceway surface and the second raceway surface;

a sealing member comprising a metallic member press fitted on the one peripheral surface, the sealing member comprising:

a first cylinder section including a first cylinder section facing surface which is in contact with the one peripheral surface;

a second cylinder section connected to the first cylinder section and including a second cylinder section facing surface which faces the one peripheral surface;

a flange section extending radially away from the second cylinder section; and a bend section for connecting the second cylinder section to the flange section, wherein, in a state before the sealing member is press fitted on the one peripheral surface, a radial position of the second cylinder section facing surface is closer to the flange section than a radial position of the first cylinder section facing surface, and wherein the first cylinder section comprises, at an axially inner end thereof, an annular protruding section that protrudes radially inwardly; and a circumferential groove, said annular protruding section being received and engaging with the circumferential groove.

* * * * *